Figure 5:
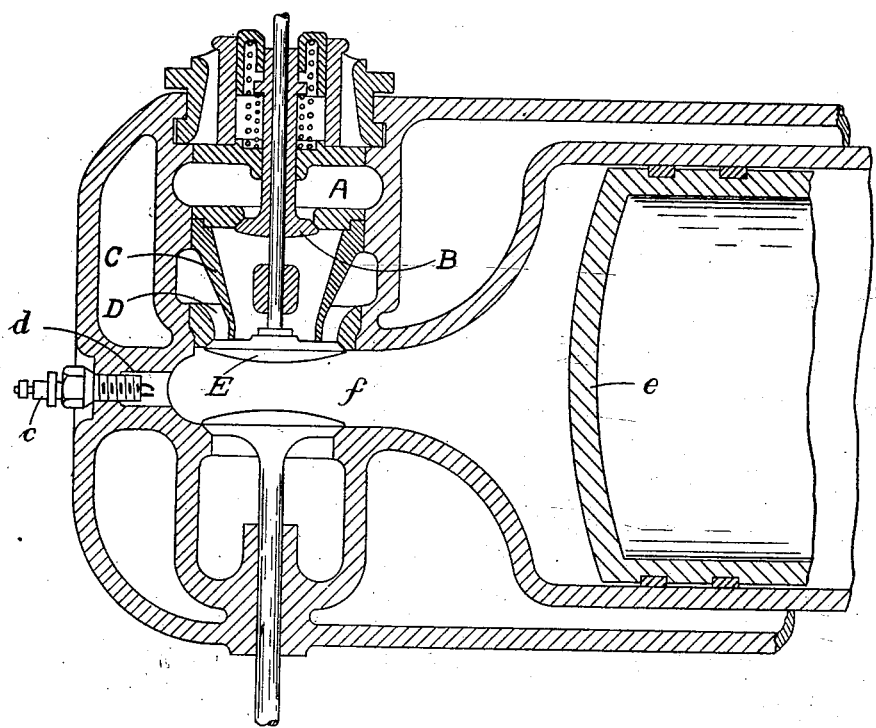

July 8, 1924.
H. HERNU
1,500,319
INTERNAL COMBUSTION ENGINE
Filed July 2, 1920 2 Sheets-Sheet 1
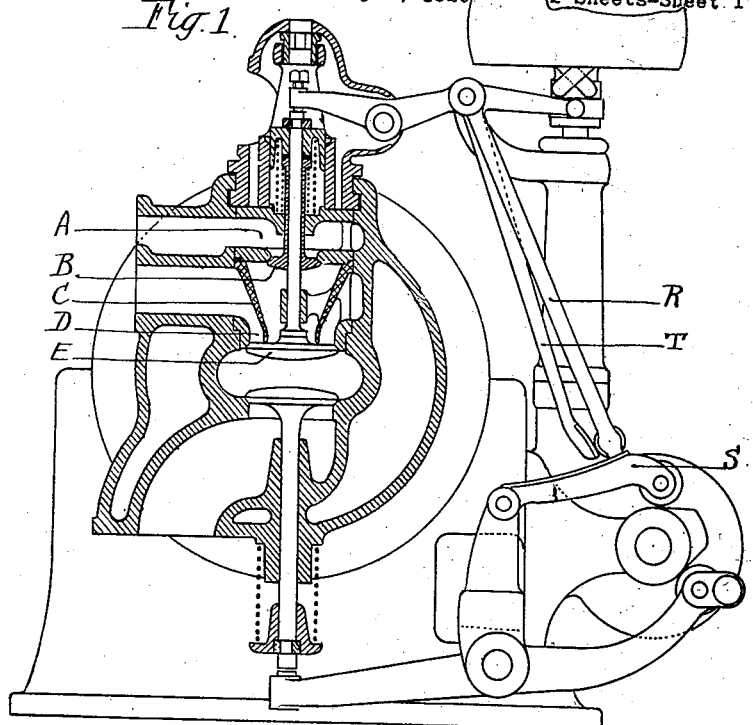
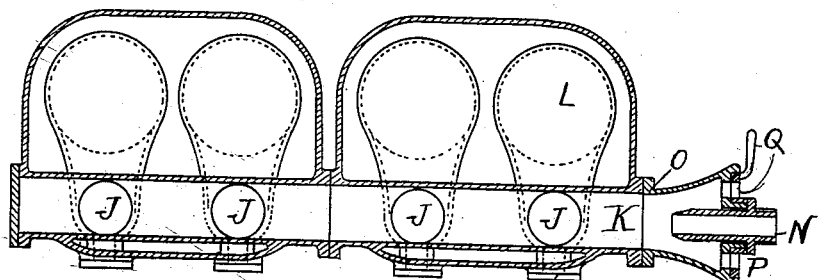
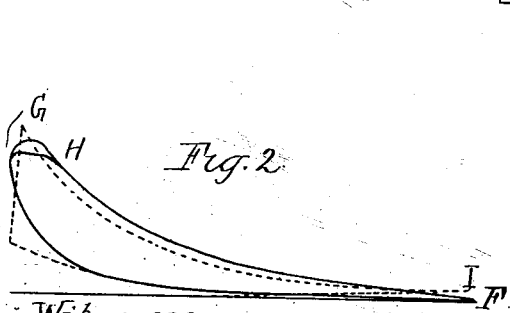
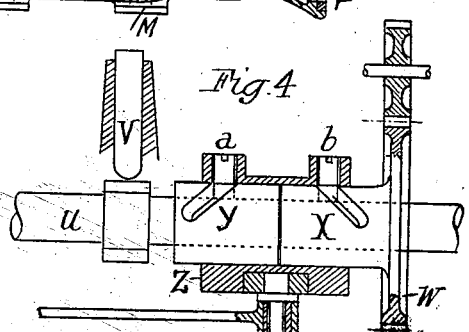
Witnesses:-
Bessie McWhirter
Edward Maw
Inventor.
Henri Hernu
By Johnston
Atty Patented July 8, 1924.

1,500,319

UNITED STATES PATENT OFFICE.

HENRI HERNU, OF MEUDON, FRANCE.

INTERNAL-COMBUSTION ENGINE.

Application filed July 2, 1920. Serial No. 393,675.

(GRANTED UNDER THE PROVISIONS OF THE ACT OF MARCH 3, 1921, 41 STAT, L., 1313.)

*To all whom it may concern:*

Be it known that I, HENRI HERNU, a citizen of the French Republic, residing at Meudon, S. et O., France, have invented a new and useful Internal-Combustion Engine, of which the following is a specification.

In an internal combustion engine the mixture of gas and air in exact proportions after energetic admixture, is compressed before the ignition, and by reason of the instantaneous increase in volume resulting from the explosion, the pressure is directed onto the piston.

In this type of motor the shape of the explosion chamber is variable, the shape having no material effect on the power of the explosion.

On the other hand the firing of the charge takes place always on the piston being near the dead centre; the advance of the spark in high speed engines, is only a fictitious advance necessitated by the fact that the magnetos or spark producing means do not operate instantaneously so that with an advance of 20 or even 40 degrees the explosion still takes place near the dead centre.

The internal combustion engine made according to the present invention acts on an entirely different principle to the two above stated inasmuch as the engine cylinder receives a non-explosive charge for slow progressive combustion.

It is characterized by the fact that the gas and air, admitted simultaneously through the open inlet valve, form an imperfect mixture during the passage through and by impact with the valve before reaching the cylinder, whilst avoiding, as far as possible, their subsequent intimate mixture. This is obtained by causing the two fluids, gas and air, to arrive by concentric conduits at the inlet valve which latter presents a sufficient surface so that the flow of the gas shall be slow in order to avoid energetic admixture of the gases in meeting at the inner surface of said valve; under these conditions the mixture is never sufficient to be explosive.

This process is exactly the reverse to what is sought for in explosion engines.

With this non-explosive mixture of air and gas it is necessary, in order to obtain slow progressive combustion, to give a particular form to the combustion chamber of the engine such that all the transverse sections from the point where the spark takes place to the surface of the piston, will be progressively enlarged, the sparking point being as far away as possible from the centre of the piston.

The embodiment of this invention is shown in the accompanying drawings, in which:

Figure 1 shows in vertical section the application of the arrangement to a horizontal motor; Fig. 2 is a diagram showing the cycle of pressure and combustion; Fig. 3 shows the application of the invention to a vertical motor; Fig. 4 shows separately the means for regulating the spark; Fig. 5 is an enlarged transverse section of Fig. 1 showing the ignition device and the combustion chamber.

As will be seen from the drawing, Fig. 1 shows a horizontal engine embodying the principles of the invention, the gas arriving by an inlet chamber A. It passes thence by the valve B into a funnel C while the air arrives concentrically by a circular inlet D.

The funnel C therefore prevents the mixture of gas and air and the whole forms inlet ports carried by a smooth-surface admission valve E.

The combustion chamber has a shallow form with symmetrical curved or elliptical side portions made to progressively enlarge in width until the sides meet the circle forming the rear end of the cylinder.

By firing the mixture as stated at the rear of this trumpet-shaped combustion chamber at the point farthest away from the piston at a proper moment as before stated, that is to say on the compression becoming sufficient for the propagation of slow combustion, the said moment will occur towards the middle of the compression stroke, the gas being compressed and ignited during the remainder of the compression period, thereby producing nearly constant pressure during a first portion of the expansion stroke followed by complete expansion and consequent low pressure in exhausting.

The cycle which results is represented in full lines in Fig. 2 which shows that the pressure is progressive from F to G and that the combustion terminated under a nearly constant pressure at H which will be seen from the diagram following a straight line or a large curve G H followed by very extended expansion H I F. The dotted line is that of an internal explosion engine; the difference of the two diagrams is clearly apparent. By slow progressive combustion, the pressures act progressively on the piston; by explosion, the latter is subjected to important instantaneous variations of pressure which causes much wear. The average pressure obtained by this combustion is greater than that by explosion though the maximum pressure is not higher.

In vertically arranged engines with several cylinders, realization of the invention is shown at Fig. 3 which comprises a single rectilinear channel K, preferably cylindrical and connecting all the admission valves J, and being of sufficient section to ensure slow velocity of the gas.

In this arrangement, the combustion chambers L present progressive sections as previously explained, the valves are superposed as in the vertical motor and the spark takes place as far away as possible from the centre of the piston rearward of the valves at the point where the plug M is fitted.

The gas arrives by a pipe N centrally disposed in an inlet aperture O fitted at the end of the member K. Air enters in the inlet O through a regulatable obturator P having openings Q symmetrically disposed around the central tube N. This obturator can likewise be formed by a valve or by a conical sleeve.

It will therefore be understood that in this arrangement the gas and air strike the valve E when same is open and then form an imperfect mixture but not an explosive mixture, and which imperfect mixture, drawn into the cylinder, undergoes low compression sufficient to become inflammable for slow combustion.

The invention further comprises detail arrangements of mechanism for controlling the valves and particularly for regulating the ignition.

In the horizontal motor Fig. 1 the members for controlling the admission comprise a connecting rod R which is displaceable under the action of the regulator, by a curved lever S so as to vary the lift of the valves.

A second lever T connected to the regulator is independent of the connecting rod R which it controls and it ceases to guide it when this connecting rod comes in contact with the curved lever S.

This arrangement ensures freedom of action of the regulator even during the lift of the valves.

The arrangement shown in Fig. 4 enables the spark to be timed by turning the shaft U controlling the spark interrupters V or the contacts, over a suitable angle in respect to the driving member of this shaft.

For this purpose, the arrangement comprises a pinion W, integral with a sleeve X and a second sleeve Y turning the shaft U which controls the spark. Both sleeves have a helicoidal groove of opposite pitch and are surrounded by a small sleeve Z longitudinally displaceable on the sleeves.

This small sleeve is rendered integral with the sleeves X Y by pegs $a$, $b$ engaging in the helicoidal grooves in such a manner that the displacement of the little sleeve Z causes the two sleeves to turn in opposite directions to each other, thereby permitting of varying at will the spark. It is well understood that the displacement of the small sleeve can be effected by any appropriate mechanism, roller, cam, lever, etc.

In Fig. 5, $c$ is an insulation for the sparking plug, fitted in a metal housing $d$ secured at the end of the passage $f$; $e$ being the piston.

I claim:

In an internal combustion engine, a cylinder, a piston therein, a trumpet-shaped water-cooled combustion chamber joining the cylinder, igniting means connected with the chamber, an exhaust valve and an admission valve seated in the chamber, a tubular gas valve mounted slidingly on the stem of the admission valve, a funnel surrounding said gas valve and forming closing contact edge with the admission valve, an airchamber around said funnel and ending in a recessed seat for the admission valve, a cam-shaft parallel with the axis of the cylinder, lever mechanism actuated by said shaft for operating the exhaust valve, and lever mechanism, actuated by the cam-shaft of the first said lever mechanism, and controlled by a speed-governor for operating conjointly the admission valve and gas valve.

HENRI HERNU.